Oct. 21, 1947.    R. STUEBNER    2,429,378
MOTORIZED POWER UNIT
Filed Nov. 16, 1945    3 Sheets-Sheet 1
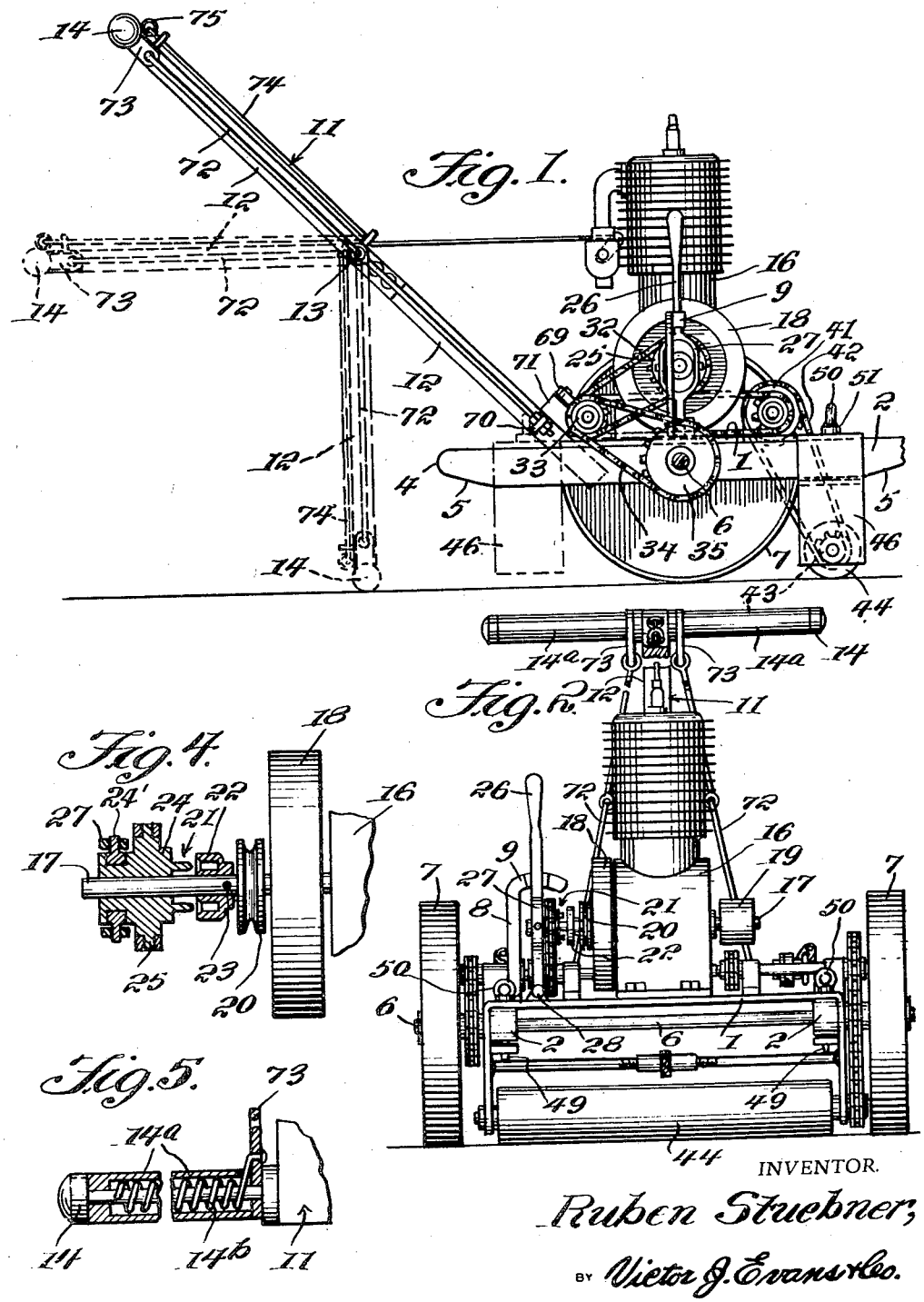
INVENTOR.
Ruben Stuebner,
BY Victor J. Evans & Co.
ATTORNEYS Oct. 21, 1947.　　R. STUEBNER　　2,429,378
MOTORIZED POWER UNIT
Filed Nov. 16, 1945　　3 Sheets-Sheet 2
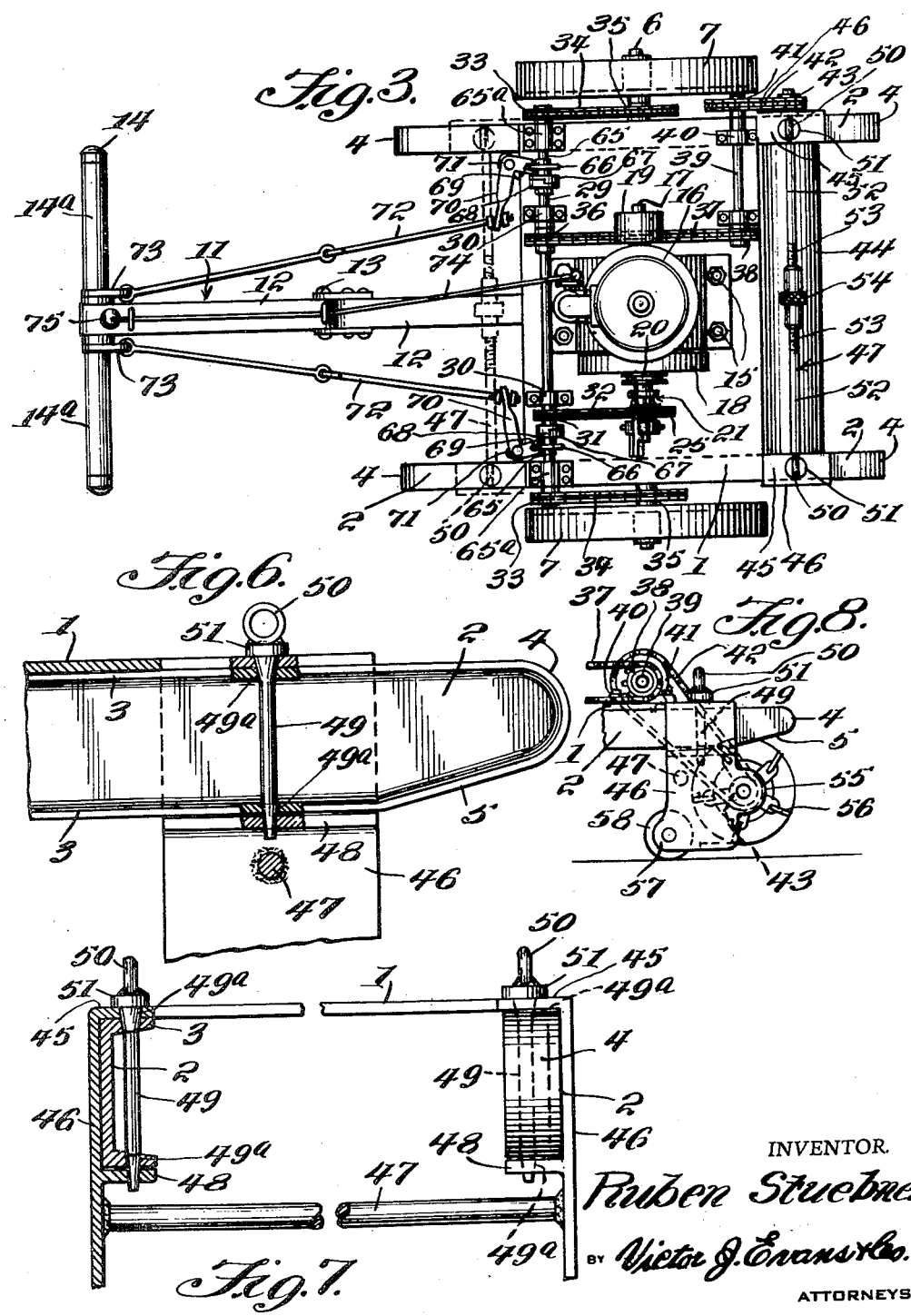
INVENTOR.
Ruben Stuebner,
BY Victor J. Evans & Co.
ATTORNEYS Oct. 21, 1947.  R. STUEBNER  2,429,378
MOTORIZED POWER UNIT
Filed Nov. 16, 1945  3 Sheets-Sheet 3
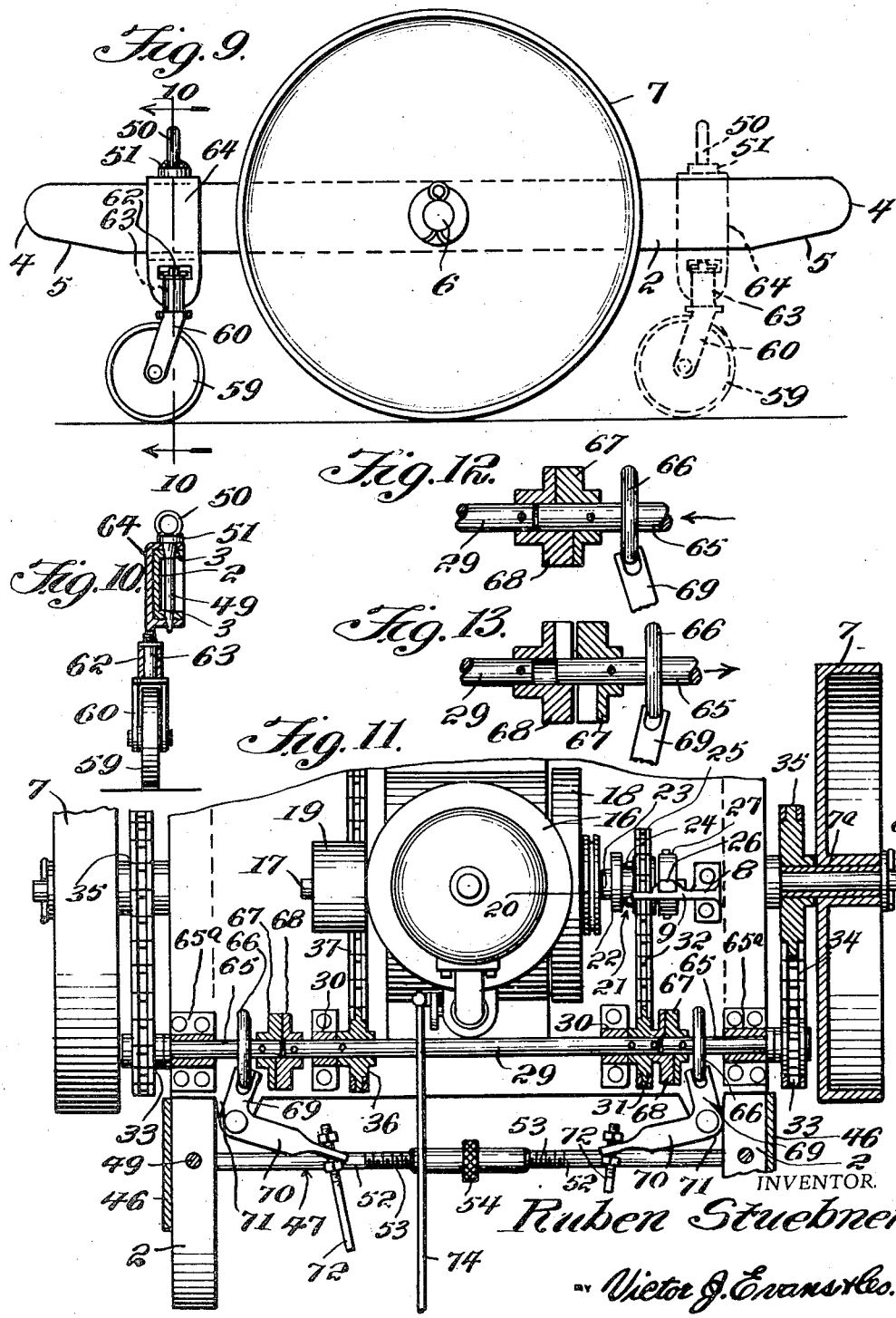
INVENTOR.
Ruben Stuebner;
BY Victor J. Evans & Co.
ATTORNEYS Patented Oct. 21, 1947

2,429,378

UNITED STATES PATENT OFFICE 2,429,378

MOTORIZED POWER UNIT

Ruben Stuebner, Arcadia, Calif.

Application November 16, 1945, Serial No. 629,056

5 Claims. (Cl. 180—19)

My present invention, in its broad aspect, has to do with improvements in mobile and portable power units to be used in driving various attachments, such for instance, as lawn mowers, plows, cultivators, rollers, harrows and the like, or to drive grinding wheels, saws, drills and the like. In attaining the objects and advantages of my invention, I provide a platform which is supported upon an axle and a pair of ground wheels when desired, or when it is determined to move the platform by applying power to the ground wheels. On the platform is mounted an internal combustion engine, or other motor to afford the power, and a transverse driving shaft with a clutch control for each ground wheel, and other suitable driving connections, not only to the ground wheels, but which may be utilized to drive a variety of attachments and the like; the motor has a flat pulley power take-off to be used upon occasion. Attached to the platform is a sectional handle, the sections of which are hinged together intermediate the ends of the handle to be used as a straight bar guide handle when the sections are aligned, or when one section is dropped down to be used as a support for the platform.

At the sides of the platform are a pair of spaced, parallel, elongated supporting stringers, upon which are designed to be mounted by means of my improved plates and frames any one of a plurality of accessories, such as a lawn mower, roller, cultivator, plow, harrow, or the like, or swivel supporting wheels, or the like. These plates are removable and novel and improved, and the platform, power unit, connections and arrangement for driving attachments are unique, improved, sturdy and practical for the purposes intended, and on the handle are suitable control elements. In other respects, my device is designed to save labor and time and can be sold with accessories to be used selectively as requirements dictate.

Other and equally important objects and advantages of my invention will be apparent from the following description and drawings, and it is pointed out that changes in size, form, shape, materials, construction and arrangement of parts is permissible and within the purview of my broad inventive concept and the scope of the appended claims.

In the drawings, wherein I have illustrated a preferred form of my invention—

Figure 1 is a side elevation of my invention;

Figure 2 is a front elevation;

Figure 3 is a top plan view;

Figure 4 is a detail view of the engine fly wheel, drive shaft, clutch and drive sprocket;

Figure 5 is a detail of the clutch steering control for the ground wheels to facilitate turns and the like;

Figure 6 is a view of one end of a supporting stringer, showing the manner of attaching a plate;

Figure 7 is a transverse section showing the manner of mounting the attachment frames and plates to the supporting stringers;

Figure 8 is a detail side view of a lawn mower attachment;

Figure 9 is a detail side view of swivel wheels attached to the supporting stringers in front and in back of the ground wheels;

Figure 10 is a section on the line 10—10 of Figure 9;

Figure 11 is a top plan view of an attachment drive and control from the handle;

Figure 12 is a section through the clutch shown in Figure 11 with the element engaged, and Figure 13 is a section through the clutch shown in Figure 11 with the element disengaged.

In the drawings, wherein like characters of reference are used to designate like or similar parts throughout the several views:

The numeral 1 designates a substantially constructed platform which is rectangular and of greater width than length and may be formed of any suitable material. Extending longitudinally of the platform 1 are supporting stringers 2. The stringers 2 are attached to the underside of the platform, one at each side edge, and each extends some distance in front and in back of the platform. The stringers 2 are alike in construction and each is formed with reinforcing edge flanges 3 and rounded ends 4, with the bottom edge angled up to the ends as at 5. Beneath the platform is a transverse axle 6 which extends through the stringers 2 and has flanged, disc ground engaging wheels 7 journaled thereon. At the back of the frame is mounted a sectional handle 11, the sections 12 of which are hinged together as at 13 to be used as a straight handle as in full lines in Figure 1 or with the rear section dropped down, as in dotted lines in Figure 1, to serve as a support coacting with the wheels to hold the platform horizontal when my device is to be stationary and used as a power element for a saw or the like. A cross-handle 14 is provided for guiding my device.

Bolted as at 15 to the platform is a power plant 16, such for instance, as an internal combustion engine, with a drive shaft 17 and a fly wheel 18, flat power take-off pulley 19, and a grooved pulley 20, to be used for power or starting of motor, by means of a rope which is wound around the pulley and pulled quickly in the usual manner for starting motors of this type.

Mounted on the shaft 17 is a clutch 21, one element 22 of which is pinned as at 23 to the shaft, and the other element 24 of which is slidable on the shaft and carries a drive sprocket 25, as shown in Figure 4. A clutch shift lever 26 has a yoke 27 which engages the element 24' slidably mounted on gear 25 for sliding the clutch element 24 into and out of engagement with clutch element 22 to power the sprocket 25. An upstanding bracket 8 secured to the platform 1 is provided with a notched arcuate portion 9 which is adapted by means of the shift lever 26 to retain the clutch 21 in engaged or disengaged positions.

A driving shaft 29 is journaled as at 30 of the platform back of the motor, and carries driving sprocket 31 having a chain connection 32 to the sprocket 25.

Also fixed on the shaft 29 is a sprocket 36 having a chain drive 37 to the sprocket 38 on a short jack shaft 39 journaled in bearings 40 in front of the motor 16.

The jack shaft 39 carries a sprocket 41 having a chain drive 42 to the sprocket 43 of the roller 44 whereby the roller 44 is driven from the motor as well as the ground wheels, and other devices may also be substituted in place of the roller, if desired.

As a means for mounting attachments on my device, such as the roller 44, and driving the same from the motor, I provide a supporting frame 45 having depending side plates 46. The side plates are connected by a brace bar 47, and each has an inwardly extending arm 48. As shown in Figures 6 and 7, the supporting frame is slid on the ends 4 of the supporting stringers 2, and removable pins 49 extending through openings 49a on the stringers and frame hold the same removably in place. The pins have eyes 50 and flanges 51. The brace rod 47 may be in sections 52 reversely threaded as at 53 to mount a turn-buckle 54 for aligning the side plates. Supporting frames may be located both front and back, or in front and in back, as shown in dotted lines in Figures 1 and 3. As shown in Figure 8, the side plates 46 of the frame 45 may be formed with forwardly extending ears 55 to journal a rotary grass cutter 56 and rearward ears 57 to journal a roller 58.

For certain types of ground working appliances, or for use in moving my device about, front and back castor wheels 59 or merely front or back castor wheels may be provided on the stringers—as shown in Figures 9 and 10. Each castor wheel is supported in the fork 60 of a swivel bearing 62 on the pin 63 of a U-shaped bracket 64 which is supported on the stringers and is held in place by the pins 49.

Means for controlling the operation of my device from the cross handle 14 and the form of drive is shown in Figures 11—12—13, wherein short sections 65 forming stub shafts are mounted on opposite ends of shaft 29 and are journaled at 65a on platform 1. Each of the sections have a collar 66 fixed thereon and each section is slidable and carries clutch elements 67 which are adapted to engage the clutch elements 68 to rotate the sections 65. Sprockets 33 on the end of the sections 65 are connected by chain belts 34 to sprockets 35 formed on the hub 7a of the ground wheels 7 to move my device over the ground when the clutch elements 67 and 68 are engaged. The collars 66 are engaged by forked arms 69 of bell-crank levers 70 pivoted on the brackets 71, the other arms of which are engaged by the rods 72 which extend to handle 14a which has pivoted operating levers 73 to actuate the clutches. Therefore, both wheels can be driven simultaneously or either the right or left wheel may be driven while the opposite wheel acts as a pivot in turning corners or the like.

The extending sections 14a of the handle 14 are hollow to house the springs 14b, the action of which is to keep the clutch elements engaged through the rods 72 until the handle sections 14a are rotated by the operator, thereby providing means for stopping either wheel of the platform to turn the power unit as desired.

A flexible carburetor control rod 74 operated as at 75 from the handle 14 controls the speed of operation of the motor 16. It will thus be seen that many different types of attachments may be used with my power unit and these are fully controlled, and my device is adapted for use in a wide range of practical applications.

From the foregoing, it is believed that the operation and advantages of my invention will be apparent, but it is again emphasized that interpretation of the scope of my invention should only be conclusive when made in the light of the subjoined claims.

I claim:

1. In a mobile power unit, a platform, a transversely disposed axle suspended below the platform intermediate of the ends thereof, supporting wheels rotatably mounted on the ends of the axle, a handle hinged midway of the length thereof extending diagonally upward from the rear of the platform, the outer end of the handle adapted to be actuated downward to a vertical position to coact with the wheels to support the platform in substantially a horizontal position, a motor positioned on the platform, a transversely disposed driving shaft mounted on the platform, means actuating the driving shaft from the motor, means driving the wheels independently from the driving shaft, a jack shaft mounted on the platform, attaching means for suspending a tool from the platform, means operating the tool from the jack shaft, and means controlling the motor and the wheel driving means from the end of the handle when in its extended position.

2. In a mobile power unit, the combination, which comprises, a platform having spaced parallel longitudinally extending stringers on the under surface with the ends of the stringers extending beyond the ends of the platform, a transversely disposed axle mounted on the stringers intermediate the ends thereof, supporting wheels rotatably mounted on the ends of the axle, a handle hinged midway of the length thereof extending diagonally upward from the rear of the platform, the outer end of the handle adapted to be actuated downward to a vertical position to coact with the wheels to support the platform in substantially a horizontal position, a motor positioned on the platform, a transversely disposed driving shaft mounted on the platform, means actuating the driving shaft from the motor, means driving the wheels independently from the driving shaft, a jack shaft mounted on the platform, attaching means for removably mounting a tool on the ends of the stringers, means actuating the tool from the said jack shaft and means controlling the motor and the wheel driving means from the end of the handle with the handle in its extended position.

3. In a mobile power unit, the combination, which comprises, a platform having spaced parallel longitudinally extending stringers on the under surface with the ends of the stringers extending beyond the ends of the platform, a transversely disposed axle mounted on the stringers intermediate the ends thereof, supporting wheels rotatably mounted on the ends of the axle, a handle hinged midway of the length thereof extending upward from the rear of the platform, the outer end of the handle adapted to be actuated downward to a vertical position to coact with the wheels to support the platform in substantially a horizontal position, a motor positioned on the platform, a transversely disposed driving shaft mounted on the platform, means actuating the driving shaft from the motor, driving sprockets on the driving shaft aligned with sprockets on the wheels, chains trained over the sprockets of the driving shaft and wheels, clutch elements on the driving shaft associated with the sprockets driving the sprockets of the wheels, means actuating the said clutch elements from the handle when in its extended position independently for disengaging either wheel from the said driving means, a jack shaft mounted on the platform, means actuating the jack shaft from the driving shaft, implement supporting hangers suspended from the stringers, and means driving an implement supported by the hangers from the said jack shaft.

4. In a mobile power unit, the combination, which comprises, a platform having spaced longitudinally positioned stringers on the under surface with the ends of the stringers extending beyond the ends of the platform, a transversely disposed axle mounted on the stringers intermediate the ends of the platform, supporting wheels rotatably mounted on the ends of the axle, a handle hinged midway of the length thereof extending upward from the rear of the platform, the outer end of the handle adapted to be actuated downward to a vertical position to coact with the wheels to support the platform in substantially a horizontal position, a motor mounted on the platform, a transversely disposed driving shaft mounted on the platform, means driving the driving shaft from the motor, stub shafts positioned at the ends of the driving shaft and aligned therewith, clutches operatively connecting the stub shafts to the driving shaft, means driving the wheels from the said stub shafts, a jack shaft mounted on the platform operatively associated with the driving shaft, implement driving means on said jack shaft, and means controlling the motor and the wheel driving means from the end of the handle with the handle in its extended position.

5. In a mobile power unit, the combination, which comprises, a platform having spaced longitudinally extending stringers on the under surface with the ends of the stringers extending beyond the ends of the platform, a transversely disposed axle extending through the stringers positioned midway of the length of the platform, supporting wheels mounted on the ends of the axle, a handle hinged midway of the length thereof extending from the rear of the platform, the outer end of the handle adapted to be actuated to a vertical position to coact with the wheels to support the platform in substantially a horizontal position, a motor positioned on the platform, a transversely disposed driving shaft mounted on the platform, a jack shaft also mounted on the platform, sprockets and chains actuating the driving shaft from the motor and the jack shaft and wheels from the driving shaft, vertically disposed plates supporting an implement therebetween and removably suspended from the ends of the stringers, means operatively connecting the implement to the jack shaft, and means controlling the motor and the wheel actuating means from the end of the handle with the handle in its extended position.

RUBEN STUEBNER.

REFERENCES CITED

The following references are of record in the file of this patent:

UNITED STATES PATENTS

| Number | Name | Date |
|---|---|---|
| 1,230,655 | Best et al. | June 19, 1917 |
| 1,554,744 | Mack | Sept. 22, 1925 |
| 1,858,618 | Carlson | May 17, 1932 |
| 2,046,424 | Palen | July 7, 1936 |
| 2,138,239 | Irgens | Nov. 29, 1938 |
| 2,260,344 | Shaw | Oct. 28, 1941 |

FOREIGN PATENTS

| Number | Country | Date |
|---|---|---|
| 486,651 | France | Apr. 30, 1918 |